(12) United States Patent
Bertin et al.

(10) Patent No.: US 11,859,056 B2
(45) Date of Patent: Jan. 2, 2024

(54) SEGMENTED SILICONE POLYMERS AND METHODS OF MAKING AND USING THE SAME

(71) Applicant: Wilmar Trading Pte. Ltd., Singapore (SG)

(72) Inventors: Paul A. Bertin, Western Springs, IL (US); Charles Coburn, Vernon Hills, IL (US)

(73) Assignee: Wilmar Trading Pte. LTD., Singapore (SG)

( * ) Notice: Subject to any disclaimer, the term of this patent is extended or adjusted under 35 U.S.C. 154(b) by 0 days.

(21) Appl. No.: 17/499,058

(22) Filed: Oct. 12, 2021

(65) Prior Publication Data

US 2022/0025128 A1 Jan. 27, 2022

Related U.S. Application Data

(63) Continuation of application No. 16/573,293, filed on Sep. 17, 2019, now Pat. No. 11,174,351.

(60) Provisional application No. 62/732,338, filed on Sep. 17, 2018.

(51) Int. Cl.
| | | |
|---|---|---|
| C08G 77/50 | (2006.01) | |
| C08G 77/12 | (2006.01) | |
| C08G 77/18 | (2006.01) | |
| C08G 77/54 | (2006.01) | |

(52) U.S. Cl.
CPC .............. *C08G 77/50* (2013.01); *C08G 77/12* (2013.01); *C08G 77/18* (2013.01); *C08G 77/54* (2013.01)

(58) Field of Classification Search
None
See application file for complete search history.

(56) References Cited

U.S. PATENT DOCUMENTS

| | | | |
|---|---|---|---|
| 5,063,044 A | 11/1991 | Kohl et al. | |
| 5,981,680 A * | 11/1999 | Petroff | A61K 8/898 528/31 |
| 6,051,216 A * | 4/2000 | Barr | A61K 8/898 424/DIG. 5 |
| 6,388,042 B1 | 5/2002 | O'Lenick, Jr. | |
| 6,727,340 B1 | 4/2004 | O'Lenick, Jr. | |
| 7,635,581 B2 | 12/2009 | Ferenz et al. | |
| 11,174,351 B2 | 11/2021 | Bertin et al. | |
| 11,306,184 B2 | 4/2022 | Coburn et al. | |
| 2004/0171783 A1 | 9/2004 | Cook et al. | |
| 2008/0045687 A1 | 2/2008 | Nguyen et al. | |
| 2008/0063879 A1 | 3/2008 | Lin et al. | |
| 2015/0274893 A1 | 10/2015 | O'Lenick | |
| 2016/0311982 A1 | 10/2016 | Sakurai | |
| 2017/0355721 A1 | 12/2017 | Frampton et al. | |
| 2018/0118891 A1 | 5/2018 | Ando | |
| 2018/0201795 A1 | 7/2018 | Hed et al. | |

FOREIGN PATENT DOCUMENTS

JP 2018070790 5/2018

OTHER PUBLICATIONS

U.S. Appl. No. 16/573,293, "Non-Final Office Action", dated Mar. 3, 2021, 8 pages.
U.S. Appl. No. 16/573,293, "Notice of Allowance", dated Jul. 14, 2021, 9 pages.
U.S. Appl. No. 16/573,300, "Non-Final Office Action", dated Sep. 17, 2021, 7 pages.
U.S. Appl. No. 16/573,300, "Non-Final Office Action", dated Mar. 16, 2021, 8 pages.
PCT/US2019/051446, "International Preliminary Report on Patentability", Mar. 25, 2021, 6 pages.
PCT/US2019/051446, "International Search Report and Written Opinion", Jan. 3, 2020, 9 pages.
Shepperson et al., "Polyphilic Multicomponent Dimers with Perfluorinated Cores", Molecular Crystals and Liquid Crystals, vol. 411, 2004, pp. 185-191.
Application No. EP19863876.9, Extended European Search Report, dated May 6, 2022, 7 pages.
Saghian et al., "Silicon-Containing Condensation Polymers Derived from Long-Chain Fatty Acids", Journal of Macromolecular Science: Part A—Chemistry, vol. 9, No. 3, May 5, 1975, pp. 341-356.
U.S. Appl. No. 16/573,300, Notice of Allowance dated Jan. 20, 2022, 6 pages.
U.S. Appl. No. 16/573,300, "Supplemental Notice of Allowability" dated Feb. 4, 2022, 3 pages.
U.S. Appl. No. 17/692,635, Non-Final Office Action dated Apr. 18, 2023, 9 pages.

* cited by examiner

*Primary Examiner* — Marc S Zimmer
(74) *Attorney, Agent, or Firm* — Kilpatrick Townsend & Stockton LLP

(57) ABSTRACT

Segmented silicone polymers incorporating segments formed from medium-chain fatty acids are generally disclosed herein. Methods of using such compounds, for example, as surfactants, are also disclosed herein, as well as methods of making such compounds, for example, from medium-chain fatty acids derived from natural oils.

16 Claims, No Drawings

SEGMENTED SILICONE POLYMERS AND METHODS OF MAKING AND USING THE SAME

CROSS-REFERENCE TO RELATED APPLICATIONS

The present application is a continuation of U.S. patent application Ser. No. 16/573,293 filed Sep. 17, 2019, which claims the benefit of and priority to U.S. Provisional Patent Application No. 62/732,338, filed Sep. 17, 2018, which are hereby incorporated by reference in their entireties.

TECHNICAL FIELD

Segmented silicone polymers incorporating segments formed from medium-chain fatty acids are generally disclosed herein. Methods of using such compounds, for example, as surfactants, are also disclosed herein, as well as methods of making such compounds, for example, from medium-chain fatty acids derived from natural oils.

TECHNICAL FIELD

Segmented silicone polymers incorporating segments formed from medium-chain fatty acids are generally disclosed herein. Methods of using such compounds, for example, as surfactants, are also disclosed herein, as well as methods of making such compounds, for example, from medium-chain fatty acids derived from natural oils.

BACKGROUND

Natural oils, such as seed oils, and their derivatives can provide useful starting materials for making a variety of chemical compounds. Because such compounds contain a certain degree of inherent functionality that is otherwise absent from petroleum-sourced materials, it can often be more desirable, if not cheaper, to use natural oils or their derivatives as a starting point for making certain compounds. Additionally, natural oils and their derivatives are generally sourced from renewable feedstocks. Thus, by using such starting materials, one can enjoy the concomitant advantage of developing useful chemical products without consuming limited supplies of petroleum. Further, refining natural oils can be less intensive in terms of the severity of the conditions required to carry out the refining process.

Natural oils can be refined in a variety of ways. For example, processes that rely on microorganisms can be used, such as fermentation. Chemical processes can also be used.

For example, when the natural oils contain at least one carbon-carbon double bond, olefin metathesis can provide a useful means of refining a natural oil and making useful chemicals from the compounds in the feedstock.

Metathesis is a catalytic reaction that involves the interchange of alkylidene units among compounds containing one or more double bonds (e.g., olefinic compounds) via the cleavage and formation of carbon-carbon double bonds. Metathesis may occur between two like molecules (often referred to as "self-metathesis") or it may occur between two different molecules (often referred to as "cross-metathesis"). Self-metathesis may be represented schematically as shown below in Equation (A):

(A) 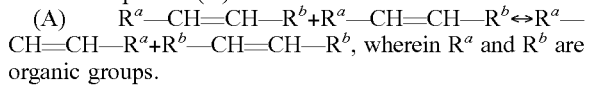 wherein $R^a$ and $R^b$ are organic groups.

Cross-metathesis may be represented schematically as shown below in Equation (B):

(B) 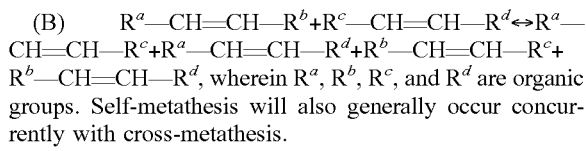 wherein $R^a$, $R^b$, $R^c$, and $R^d$ are organic groups. Self-metathesis will also generally occur concurrently with cross-metathesis.

In recent years, there has been an increased demand for environmentally friendly techniques for manufacturing materials typically derived from petroleum sources, which can be made by processes that involve olefin metathesis. This has led to studies of the feasibility of manufacturing biofuels, waxes, plastics, and the like, using natural oil feedstocks, such as vegetable and/or seed-based oils.

Natural oil feedstocks of interest include, but are not limited to, oils such as natural oils (e.g., vegetable oils, fish oils, algae oils, and animal fats), and derivatives of natural oils, such as free fatty acids and fatty acid alkyl (e.g., methyl) esters. These natural oil feedstocks may be converted into industrially useful chemicals (e.g., waxes, plastics, cosmetics, biofuels, etc.) by any number of different metathesis reactions. Significant reaction classes include, as non-limiting examples, self-metathesis, cross-metathesis with olefins, and ring-opening metathesis reactions. Non-limiting examples of useful metathesis catalysts are described in further detail below.

Refining processes for natural oils (e.g., employing metathesis) can lead to compounds having chain lengths closer to those generally desired for chemical intermediates of specialty chemicals (e.g., about 9 to 15 carbon atoms). By using these compounds as starting materials, it is possible to create a variety of novel chemical compounds that may be used for a variety of useful purposes.

Silicone polymers are widely used in a number of contexts. The particular properties of these compounds are controlled, at least in part, by the chemical identity of the substituents on the silicon atoms in the chain of alternating silicon and oxygen atoms. In general, these substituents are hydrogen atoms, alkyl groups, such as methyl, and aryl groups, such as phenyl. This places some restrictions on the resulting properties of such silicone polymers. As a result, users are often forced to employ silicone polymers that fail to provide ideal properties, which therefore requires the addition of other ingredients to try to achieve the desired properties. Or, in some cases, it may require the use of non-silicone materials in instances where a silicone-based material would be desirable.

Further, silicone polymers are widely used. Therefore, it may be desirable to incorporate some percentage of renewably derived material into the polymers, instead of using material derived from fossil fuel sources.

Thus, there is a continuing need to develop silicone polymers that are renewably sourced, and can serve as suitable compounds for making a silicone polymers.

SUMMARY

The present disclosure provides novel silicone polymers that are derived from renewable sources and that are built from difunctional building blocks that are easy to react at the silicon atoms of the polymer. Throughout this specification, silicone and siloxane are used interchangeably.

In a first aspect, the disclosure provides siloxane polymers comprising:
(a) one or more segments of formula (I):

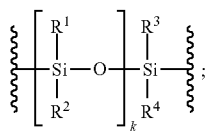 (I)

and
(b) one or more segments of formula (II):

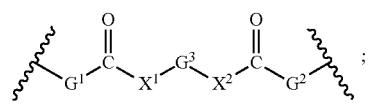 (II)

wherein: each $R^1$, $R^2$, $R^3$, and $R^4$ is independently a hydrogen atom, a $C_{1-14}$ hydrocarbyl group, or a $C_{1-14}$ hydrocarbyloxy group; each $X^1$ and $X^2$ is independently an oxygen atom, a sulfur atom, >NH, or >N($C_{1-6}$alkyl); each $G^1$ and $G^2$ is independently a $C_{1-14}$ hydrocarbylene group; each $G^3$ is independently a $C_{1-50}$ hydrocarbylene group, which is optionally substituted one or more times by substituents selected from the group consisting of —OH and —O($C_{1-6}$alkyl), or a $C_{2-120}$ oxyalkylene group; and each k is independently an integer ranging from 5 to 5000.

In a second aspect, the disclosure provides silicone compositions, the silicone compositions comprising one or more siloxane polymers of the first aspect.

In a third aspect, the disclosure provides articles of manufacture, which comprise a portion formed from a silicone composition of the second aspect.

Further aspects and embodiments are provided in the foregoing detailed description and claims.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As used herein, "polymer" refers to a substance having a chemical structure that includes the multiple repetition of constitutional units formed from substances of comparatively low relative molecular mass relative to the molecular mass of the polymer.

The term "polymer" includes soluble and/or fusible molecules having chains of repeat units, and also includes insoluble and infusible networks. As used herein, the term "polymer" can include oligomeric compounds, which have only a few (e.g., 5-100) constitutional units.

As used herein, "silicone polymer" or "siloxane polymer" refer to a polymer that includes a series of repeating constitutional units having unsubstituted or substituted silicon atoms and oxygen atoms, e.g., —Si—O—Si—O—Si—O—Si—O—Si—O—, wherein each silicon atom is additionally attached to two hydrogen atoms, non-hydrogen substituents, or a combination thereof. In general, the silicone polymers or siloxane polymers envisioned herein have a weight-average molecular weight of at least 500 Da, or 1 kDa. Such polymers can also contain additional constitutional units, including additional non-siloxane blocks, thereby resulting in copolymers, such as graft copolymers and block copolymers. As used herein, silicone polymers or siloxane polymers includes oligomeric compounds, which have only a few (e.g., 5-100) constitutional units.

As used herein, "natural oil," "natural feedstock," or "natural oil feedstock" refer to oils derived from plants or animal sources. These terms include natural oil derivatives, unless otherwise indicated. The terms also include modified plant or animal sources (e.g., genetically modified plant or animal sources), unless indicated otherwise. Examples of natural oils include, but are not limited to, vegetable oils, algae oils, fish oils, animal fats, tall oils, derivatives of these oils, combinations of any of these oils, and the like. Representative non-limiting examples of vegetable oils include rapeseed oil (canola oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil feedstock comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil feedstock.

As used herein, "natural oil derivatives" refers to the compounds or mixtures of compounds derived from a natural oil using any one or combination of methods known in the art. Such methods include but are not limited to saponification, fat splitting, transesterification, esterification, hydrogenation (partial, selective, or full), isomerization, oxidation, and reduction. Representative non-limiting examples of natural oil derivatives include gums, phospholipids, soapstock, acidulated soapstock, distillate or distillate sludge, fatty acids and fatty acid alkyl ester (e.g. non-limiting examples such as 2-ethylhexyl ester), hydroxy substituted variations thereof of the natural oil. For example, the natural oil derivative may be a fatty acid methyl ester ("FAME") derived from the glyceride of the natural oil. In some embodiments, a feedstock includes canola or soybean oil, as a non-limiting example, refined, bleached, and deodorized soybean oil (i.e., RBD soybean oil). Soybean oil typically comprises about 95% weight or greater (e.g., 99% weight or greater) triglycerides of fatty acids. Major fatty acids in the polyol esters of soybean oil include saturated fatty acids, as a non-limiting example, palmitic acid (hexadecanoic acid) and stearic acid (octadecanoic acid), and unsaturated fatty acids, as a non-limiting example, oleic acid (9-octadecenoic acid), linoleic acid (9, 12-octadecadienoic acid), and linolenic acid (9,12,15-octadecatrienoic acid).

As used herein, "metathesis catalyst" includes any catalyst or catalyst system that catalyzes an olefin metathesis reaction.

As used herein, "metathesize" or "metathesizing" refer to the reacting of a feedstock in the presence of a metathesis catalyst to form a "metathesized product" comprising new olefinic compounds, i.e., "metathesized" compounds. Metathesizing is not limited to any particular type of olefin metathesis, and may refer to cross-metathesis (i.e., co-metathesis), self-metathesis, ring-opening metathesis, ring-opening metathesis polymerizations ("ROMP"), ring-closing metathesis ("RCM"), and acyclic diene metathesis ("ADMET"). In some embodiments, metathesizing refers to reacting two triglycerides present in a natural feedstock (self-metathesis) in the presence of a metathesis catalyst, wherein each triglyceride has an unsaturated carbon-carbon double bond, thereby forming a new mixture of olefins and esters which may include a triglyceride dimer. Such triglyceride dimers may have more than one olefinic bond, thus higher oligomers also may form. Additionally, in some other embodiments, metathesizing may refer to reacting an olefin, such as ethylene, and a triglyceride in a natural feedstock having at least one unsaturated carbon-carbon double bond, thereby forming new olefinic molecules as well as new ester molecules (cross-metathesis).

As used herein, "olefin" or "olefins" refer to compounds having at least one unsaturated carbon-carbon double bond. In certain embodiments, the term "olefins" refers to a group of unsaturated carbon-carbon double bond compounds with different carbon lengths. Unless noted otherwise, the terms "olefin" or "olefins" encompasses "polyunsaturated olefins" or "poly-olefins," which have more than one carbon-carbon double bond. As used herein, the term "monounsaturated olefins" or "mono-olefins" refers to compounds having only one carbon-carbon double bond. A compound having a terminal carbon-carbon double bond can be referred to as a "terminal olefin," while an olefin having a non-terminal carbon-carbon double bond can be referred to as an "internal olefin."

As used herein, the term "low-molecular-weight olefin" may refer to any one or combination of unsaturated straight, branched, or cyclic hydrocarbons in the $C_{2-14}$ range. Low-molecular-weight olefins include "alpha-olefins" or "terminal olefins," wherein the unsaturated carbon-carbon bond is present at one end of the compound. Low-molecular-weight olefins may also include dienes or trienes. Low-molecular-weight olefins may also include internal olefins or "low-molecular-weight internal olefins." In certain embodiments, the low-molecular-weight internal olefin is in the $C_{4-14}$ range. Examples of low-molecular-weight olefins in the $C_{2-6}$ range include, but are not limited to: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1,4-pentadiene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. Non-limiting examples of low-molecular-weight olefins in the $C_{7-9}$ range include 1,4-heptadiene, 1-heptene, 3,6-nonadiene, 3-nonene, 1,4,7-octatriene. Other possible low-molecular-weight olefins include styrene and vinyl cyclohexane. In certain embodiments, it is preferable to use a mixture of olefins, the mixture comprising linear and branched low-molecular-weight olefins in the $C_{4-10}$ range. In one embodiment, it may be preferable to use a mixture of linear and branched $C_4$ olefins (i.e., combinations of: 1-butene, 2-butene, and/or isobutene). In other embodiments, a higher range of $C_{11-14}$ may be used.

In some instances, the olefin can be an "alkene," which refers to a straight- or branched-chain non-aromatic hydrocarbon having 2 to 30 carbon atoms and one or more carbon-carbon double bonds, which may be optionally substituted, as herein further described, with multiple degrees of substitution being allowed. A "monounsaturated alkene" refers to an alkene having one carbon-carbon double bond, while a "polyunsaturated alkene" refers to an alkene having two or more carbon-carbon double bonds. A "lower alkene," as used herein, refers to an alkene having from 2 to 10 carbon atoms.

As used herein, "alpha-olefin" refers to an olefin (as defined above) that has a terminal carbon-carbon double bond. In some embodiments, the alpha-olefin is a terminal alkene, which is an alkene (as defined above) having a terminal carbon-carbon double bond. Additional carbon-carbon double bonds can be present.

As used herein, "ester" or "esters" refer to compounds having the general formula: R—COO—R', wherein R and R' denote any organic group (such as alkyl, aryl, or silyl groups) including those bearing heteroatom-containing substituent groups. In certain embodiments, R and R' denote alkyl, alkenyl, aryl, or alcohol groups. In certain embodiments, the term "esters" may refer to a group of compounds with the general formula described above, wherein the compounds have different carbon lengths. In certain embodiments, the esters may be esters of glycerol, which is a trihydric alcohol. The term "glyceride" can refer to esters where one, two, or three of the —OH groups of the glycerol have been esterified.

It is noted that an olefin may also comprise an ester, and an ester may also comprise an olefin, if the R or R' group in the general formula R—COO—R' contains an unsaturated carbon-carbon double bond. Such compounds can be referred to as "unsaturated esters" or "olefin esters." Further, a "terminal olefin ester" may refer to an ester compound where R has an olefin positioned at the end of the chain. An "internal olefin ester" may refer to an ester compound where R has an olefin positioned at an internal location on the chain. Additionally, the term "terminal olefin" may refer to an ester or an acid thereof where R' denotes hydrogen or any organic compound (such as an alkyl, aryl, or silyl group) and R has an olefin positioned at the end of the chain, and the term "internal olefin" may refer to an ester or an acid thereof where R' denotes hydrogen or any organic compound (such as an alkyl, aryl, or silyl group) and R has an olefin positioned at an internal location on the chain.

As used herein, "hydrocarbon" refers to an organic group composed of carbon and hydrogen, which can be saturated or unsaturated, and can include aromatic groups. The term "hydrocarbyl" refers to a monovalent or polyvalent hydrocarbon moiety.

As used herein, "alkyl" refers to a straight or branched chain saturated hydrocarbon having 1 to 30 carbon atoms, which may be optionally substituted, as herein further described, with multiple degrees of substitution being allowed. Examples of "alkyl," as used herein, include, but are not limited to, methyl, ethyl, n-propyl, isopropyl, isobutyl, n-butyl, sec-butyl, tert-butyl, isopentyl, n-pentyl, neopentyl, n-hexyl, and 2-ethylhexyl. The number of carbon atoms in an alkyl group is represented by the phrase "$C_{x-y}$ alkyl," which refers to an alkyl group, as herein defined, containing from x to y, inclusive, carbon atoms. Thus, "$C_{1-6}$ alkyl" represents an alkyl chain having from 1 to 6 carbon atoms and, for example, includes, but is not limited to, methyl, ethyl, n-propyl, isopropyl, isobutyl, n-butyl, sec-butyl, tert-butyl, isopentyl, n-pentyl, neopentyl, and n-hexyl. In some instances, the "alkyl" group can be divalent, in which case the group can alternatively be referred to as an "alkylene" group. Also, in some instances, one or more of the carbon atoms in the alkyl or alkylene group can be replaced by a heteroatom (e.g., selected from nitrogen, oxygen, or sulfur, including quaternary nitrogen atoms, N-oxides, sulfur oxides, and sulfur dioxides, where feasible), and is referred to as a "heteroalkyl" or "heteroalkylene" group, respectively. Non-limiting examples include "oxyalkyl" or "oxyalkylene" groups, which are groups of the following formulas: -[-(alkylene)-O-]$_v$-alkyl, or -[-(alkylene)-O-]$_v$-alkylene-, respectively, where v is 1 or more, such as 1, 2, 3, 4, 5, 6, 7, 8, 9, 10, 11, 12, 13, 14, 15, 16, 17, 18, 19, 20, or the like.

As used herein, "alkenyl" refers to a straight or branched chain non-aromatic hydrocarbon having 2 to 30 carbon atoms and having one or more carbon-carbon double bonds, which may be optionally substituted, as herein further described, with multiple degrees of substitution being allowed. Examples of "alkenyl," as used herein, include, but are not limited to, ethenyl, 2-propenyl, 2-butenyl, and 3-butenyl. The number of carbon atoms in an alkenyl group is represented by the phrase "$C_{x-y}$ alkenyl," which refers to an alkenyl group, as herein defined, containing from x to y, inclusive, carbon atoms. Thus, "$C_2$-alkenyl" represents an alkenyl chain having from 2 to 6 carbon atoms and, for example, includes, but is not limited to, ethenyl, 2-propenyl, 2-butenyl, and 3-butenyl. In some instances, the "alkenyl" group can be divalent, in which case the group can alternatively be referred to as an "alkenylene" group.

As used herein, "halogen" or "halo" refers to a fluorine, chlorine, bromine, and/or iodine atom. In some embodiments, the terms refer to fluorine or chlorine. As used herein, "haloalkyl" or "haloalkoxy" refer to alkyl or alkoxy groups, respectively, substituted by one or more halogen atoms. The terms "perfluoroalkyl" or "perfluoroalkoxy" refer to alkyl groups and alkoxy groups, respectively, where every available hydrogen is replaced by fluorine.

As used herein, "aryl" refers to a 6- to 30-membered cyclic, aromatic hydrocarbon, which may be optionally substituted as herein further described, with multiple degrees of substitution being allowed. Examples of "aryl" groups as used herein include, but are not limited to, phenyl and naphthyl. As used herein, the term "aryl" also includes ring systems in which a phenyl or naphthyl group is optionally fused with one to three non-aromatic, saturated or unsaturated, carbocyclic rings. For example, "aryl" would include ring systems such as indene, with attachment possible to either the aromatic or the non-aromatic ring(s).

As used herein, "substituted" refers to substitution of one or more hydrogen atoms of the designated moiety with the named substituent or substituents, multiple degrees of substitution being allowed unless otherwise stated, provided that the substitution results in a stable or chemically feasible compound. A stable compound or chemically feasible compound is one in which the chemical structure is not substantially altered when kept at a temperature from about −80° C. to about +40° C., in the absence of moisture or other chemically reactive conditions, for at least a week. As used herein, the phrases "substituted with one or more . . . " or "substituted one or more times . . . " refer to a number of substituents that equals from one to the maximum number of substituents possible based on the number of available bonding sites, provided that the above conditions of stability and chemical feasibility are met.

As used herein, "mix" or "mixed" or "mixture" refers broadly to any combining of two or more compositions. The two or more compositions need not have the same physical state; thus, solids can be "mixed" with liquids, e.g., to form a slurry, suspension, or solution. Further, these terms do not require any degree of homogeneity or uniformity of composition. This, such "mixtures" can be homogeneous or heterogeneous, or can be uniform or non-uniform. Further, the terms do not require the use of any particular equipment to carry out the mixing, such as an industrial mixer.

As used herein, "optionally" means that the subsequently described event(s) may or may not occur. In some embodiments, the optional event does not occur. In some other embodiments, the optional event does occur one or more times.

As used herein, "comprise" or "comprises" or "comprising" or "comprised of" refer to groups that are open, meaning that the group can include additional members in addition to those expressly recited. For example, the phrase, "comprises A" means that A must be present, but that other members can be present too. The terms "include," "have," and "composed of" and their grammatical variants have the same meaning. In contrast, "consist of" or "consists of" or "consisting of" refer to groups that are closed. For example, the phrase "consists of A" means that A and only A is present.

As used herein, "or" is to be given its broadest reasonable interpretation, and is not to be limited to an either/or construction. Thus, the phrase "comprising A or B" means that A can be present and not B, or that B is present and not A, or that A and B are both present. Further, if A, for example, defines a class that can have multiple members, e.g., $A_1$ and $A_2$, then one or more members of the class can be present concurrently.

As used herein, the various functional groups represented will be understood to have a point of attachment at the functional group having the hyphen or dash (-) or an asterisk (*). In other words, in the case of —CH$_2$CH$_2$CH$_3$, it will be understood that the point of attachment is the CH$_2$ group at the far left. If a group is recited without an asterisk or a dash, then the attachment point is indicated by the plain and ordinary meaning of the recited group.

In some instances herein, organic compounds are described using the "line structure" methodology, where chemical bonds are indicated by a line, where the carbon atoms are not expressly labeled, and where the hydrogen atoms covalently bound to carbon (or the C—H bonds) are not shown at all. For example, by that convention, the formula

represents n-propane. In some instances herein, a squiggly bond is used to show the compound can have any one of two or more isomers. For example, the structure

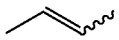

can refer to (E)-2-butene or (Z)-2-butene.

As used herein, multi-atom bivalent species are to be read from left to right. For example, if the specification or claims recite A-D-E and D is defined as —OC(O)—, the resulting group with D replaced is: A-OC(O)-E and not A-C(O)O-E.

Other terms are defined in other portions of this description, even though not included in this subsection.

Siloxane Polymers

In a one or more aspects, the disclosure provides siloxane polymers comprising:

(a) one or more segments of formula (I):

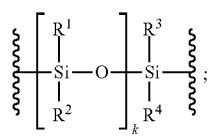

and (b) one or more segments of formula (II):

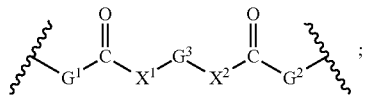

wherein: each $R^1$, $R^2$, $R^3$, and $R^4$ is independently a hydrogen atom, a $C_{1-14}$ hydrocarbyl group, or a $C_{1-14}$ hydrocarbyloxy group; each $X^1$ and $X^2$ is independently an oxygen atom, a sulfur atom, >NH, or >N($C_{1-6}$ alkyl); each $G^1$ and $G^2$ is independently a $C_{1-14}$ hydrocarbylene group; each $G^3$ is independently a $C_{1-50}$ hydrocarbylene group, which is optionally substituted one or more times by substituents selected from the group consisting of —OH and —O($C_{1-6}$alkyl), or a $C_{2-120}$ oxyalkylene group; and each k is independently an integer ranging from 5 to 5000.

The segments of formula (II) can have any suitable chemical structure, according to the formula set forth above. These segments can, in some embodiments, be derived from renewable oils. For example, in some embodiments, compounds such as 9-decenoic acid, 10-undecenoic acid, 11-dodecenoic acid, or esters thereof, can be reacted with a polyol, such as ethylene glycol or polyethylene glycols, to form difunctional segments having two terminal carbon-carbon double bonds that have reactive affinity to certain silanes. Thus, in some embodiments, each $G^1$ is independently a $C_{9-11}$ alkylene group. In some further such embodiments, each $G^1$ is independently —$(CH_2)_9$—, —$(CH_2)_{10}$—, or —$(CH_2)_{11}$—. In some further such embodiments, each $G^1$ is independently —$(CH_2)_9$— or —$(CH_2)_{11}$—. In some further such embodiments, each $G^1$ is —$(CH_2)_9$—. In some other such embodiments, each $G^1$ is —$(CH_2)_{10}$—. In some other such embodiments, each $G^1$ is —$(CH_2)_{11}$—. In an analogous manner, in some embodiments according to any of the aforementioned embodiments, each $G^2$ is independently a $C_{9-11}$ alkylene group. In some further such embodiments, each $G^2$ is independently —$(CH_2)_9$—, —$(CH_2)_{10}$—, or —$(CH_2)_{11}$—. In some further such embodiments, each $G^2$ is independently —$(CH_2)_9$— or —$(CH_2)_{11}$—. In some further such embodiments, each $G^2$ is —$(CH_2)_9$—. In some other such embodiments, each $G^2$ is —$(CH_2)_{10}$—. In some other such embodiments, each $G^2$ is —$(CH_2)_{11}$—.

The variable $G^3$ can have any suitable value. As noted above, the segments of formula (II) can, in some embodiments, be formed by reacting two terminally unsaturated monobasic fatty acids (or esters thereof) with a polyol. Thus, in some embodiments, $G^3$ can be any formed from any suitable polyol moiety. In some embodiments, each $G^3$ is independently a $C_{1-50}$ hydrocarbylene group, which is optionally substituted one or more times by substituents selected from the group consisting of —OH and —O($C_{1-6}$alkyl). In some further such embodiments, each $G^3$ is a $C_{1-14}$alkylene group, which is optionally substituted one or more times by substituents selected from the group consisting of —OH and —O($C_{1-6}$alkyl). In some further embodiments, each $G^3$ is an unsubstituted $C_{1-14}$alkylene group. In some further embodiments, each $G^3$ is an unsubstituted $C_{1-8}$ alkylene group, such as a methylene group, an ethylene group, a 1,2-propylene group, a 1,3-propylene group, a 1,4-butylene group, a 1,5-pentylene group, a 1,6-hexylene group, and the like. In some embodiments, each $G^3$ is an ethylene group, a 1,2-propylene group, or a 1,3-propylene group. In some further such embodiments, each $G^3$ is an ethylene group.

The variables $X^1$ and $X^2$ can have any suitable value, according to the embodiments set forth above. As noted, in some embodiments, the segments according to formula (II) can be formed from reacting terminally unsaturated acids with polyols. In such embodiments, $X^1$ and $X^2$ are both an oxygen atom in each instance. In some other embodiments, however, the compounds besides polyols can be used to connect the terminally unsaturated acids. Thus, in some other embodiments, $X^1$ and $X^2$ are both a sulfur atom in each instance. In some other embodiments, in each instance, $X^1$ and $X^2$ are independently >NH or >N($C_{1-6}$alkyl), such as >NH or >N($CH_3$).

The segments of formula (I) can have any suitable chemical structure, according to the formula set forth above. In some embodiments, each $R^1$, $R^2$, $R^3$, and $R^4$ is independently a hydrogen atom, a $C_{1-14}$ hydrocarbyl group, or a $C_{1-14}$ hydrocarbyloxy group. In some such embodiments, each $R^1$, $R^2$, $R^3$, and $R^4$ is independently a $C_{1-14}$ hydrocarbyl group. In some further embodiments, each $R^1$, $R^2$, $R^3$, and $R^4$ is independently a $C_{1-8}$ alkyl group. In some even further embodiments, each $R^1$, $R^2$, $R^3$, and $R^4$ is independently selected from the group consisting of methyl, ethyl, propyl, and isopropyl. In some even further embodiments, each $R^1$, $R^2$, $R^3$, and $R^4$ is independently selected from the group consisting of methyl and ethyl. In some even further embodiments, each $R^1$, $R^2$, $R^3$, and $R^4$ is methyl.

In some embodiments, most, but not all, of $R^1$, $R^2$, $R^3$, and $R^4$ are independently $C_{1-6}$alkyl (such as methyl, ethyl, or isopropyl). In some such embodiments, at least 50% by number, or at least 60% by number, or at least 70% by number, or at least 80% by number, or at least 90% by number, of all $R^1$, $R^2$, $R^3$, and $R^4$ in each segment of formula (I) are independently $C_{1-6}$alkyl (such as methyl, ethyl, or isopropyl), and the remaining $R^1$, $R^2$, $R^3$, and $R^4$ are independently a hydrogen atom or $C_{1-6}$ alkoxy (such as methoxy, ethoxy, or isopropoxy). In some further such embodiments, at least one of $R^1$, $R^2$, $R^3$, and $R^4$ in each segment of formula (I) in the polymer is a hydrogen atom. In some further such embodiments, at least 50% by number, or at least 60% by number, or at least 70% by number, or at least 80% by number, or at least 90% by number, of all $R^1$, $R^2$, $R^3$, and $R^4$ in each segment of formula (I) are independently $C_{1-6}$alkyl (such as methyl, ethyl, or isopropyl), and the remaining $R^1$, $R^2$, $R^3$, and $R^4$ are independently a $C_{1-6}$alkoxy (such as methoxy, ethoxy, or isopropoxy).

The siloxane polymers disclosed herein can contain additional segments or constitutional units besides those of formula (I) and formula (II). For example, the siloxane polymers can be copolymers, which have additional constitutional units interspersed with the segments of formula (I) and formula (II). In some other cases, the siloxane polymers can be block copolymers or graft copolymers, where the polymer contains, for example, other non-siloxane segments or blocks. Thus, in some embodiments, in the siloxane polymers disclosed herein, the segments of formula (I) and the segments of formula (II) together make up at least 50% by weight, or at least 60% by weight, or at least 70% by weight, or at least 80% by weight, or at least 90% by weight, of the siloxane polymer. In some further embodiments of the foregoing embodiments, in the siloxane polymers disclosed herein, the segments of formula (I) and the segments of formula (II) together make up no more than 80% by weight, or no more than 90% by weight, or no more than 95% by weight, or no more than 97% by weight, or no more than 99% by weight, of the siloxane polymer.

The siloxane polymers disclosed herein can contain any suitable amount of the segments of formula (I). Thus, in some embodiments, in the siloxane polymers disclosed herein, the segments of formula (I) make up at least 10% by weight, or at least 20% by weight, or at least 30% by weight, or at least 40% by weight, or at least 50% by weight, of the siloxane polymer. In some further embodiments of any of the foregoing embodiments, in the siloxane polymers disclosed herein, the segments of formula (I) make up no more than 60% by weight, or no more than 70% by weight, or no more than 80% by weight, or no more than 90% by weight, or no more than 95% by weight, of the siloxane polymer.

The siloxane polymers disclosed herein can contain any suitable amount of the segments of formula (II). Thus, in some embodiments, in the siloxane polymers disclosed herein, the segments of formula (II) make up at least 30% by weight, or at least 40% by weight, or at least 50% by weight, or at least 60% by weight, or at least 70% by weight, or at least 80% by weight, or at least 90% by weight, of the siloxane polymer. In some further embodiments of any of the foregoing embodiments, in the siloxane polymers disclosed herein, the segments of formula (II) make up no more than 30% by weight, or no more than 40% by weight, or no more than 50% by weight, or no more than 60% by weight, or no more than 70% by weight, or no more than 80% by weight, or no more than 90% by weight, or no more than 95% by weight, of the siloxane polymer.

The segments of formula (I) and the segments of formula (II) can be present in the siloxane polymer in any suitable relative amounts. For example, in the siloxane polymers disclosed herein, the numerical ratio of segments of formula (I) to segments of formula (II) in the siloxane polymer ranges from 1:10 to 10:1, or from 1:7 to 7:1, or from 1:5 to 5:1, or from 1:4 to 4:1, or from 1:3 to 3:1, or from 1:2 to 2:1. In some other embodiments, the numerical ratio of segments of formula (I) to segments of formula (II) in the siloxane polymer ranges from 1:1 to 10:1, or from 1:1 to 7:1, or from 1:1 to 5:1, or from 1:1 to 4:1, or from 1:1 to 3:1, or from 1:1 to 2:1. In some other embodiments, the numerical ratio of segments of formula (II) to segments of formula (I) in the siloxane polymer ranges from 1:1 to 10:1, or from 1:1 to 7:1, or from 1:1 to 5:1, or from 1:1 to 4:1, or from 1:1 to 3:1, or from 1:1 to 2:1.

The siloxane polymers of any of the above embodiments can have any suitable physical properties. For example, in some embodiments, the siloxane polymer has a molecular weight ranging from 1 kDa to 50 kDa.

In general, the siloxane polymers disclosed herein contain two or more endcap groups. The endcap groups can have any suitable chemical structure, but are generally silane- or siloxane-based moieties. In some embodiments, the endcap groups are moieties of formula (III):

$$—(O)_m—Si(R^{21})(R^{22})(R^{23}) \quad (III)$$

wherein: $R^{21}$, $R^{22}$, and $R^{23}$ are independently a hydrogen atom, —OH, $C_{1-14}$ hydrocarbyl, or $C_{1-14}$ hydrocarbyloxy; and m is 0 or 1. In general, the value of m will vary on the chemical functionality of the group that the group is capping. For example, if the endcap group is capping a moiety that otherwise terminates in an oxygen atom, then m is typically 0, as the siloxane polymers disclosed herein do not generally contain peroxide functionality in the backbone of the polymer. On the other hand, in embodiments where the endcap group is capping a moiety that otherwise terminates in silicon or carbon, then m is 1.

In some such embodiments, at least two of $R^{21}$, $R^{22}$, and $R^{23}$ is a hydrogen atom or $C_{1-14}$ hydrocarbyl. In some further such embodiments, at least two of $R^{21}$, $R^{22}$, and $R^{23}$ is $C_{1-14}$ hydrocarbyl. In some even further such embodiments, at least two of $R^{21}$, $R^{22}$, and $R^{23}$ are selected independently from the group consisting of: methyl, ethyl, propyl, isopropyl, butyl, isobutyl, sec-butyl, tert-butyl, pentyl, or neopentyl. In some even further such embodiments, at least two of $R^{21}$, $R^{22}$, and $R^{23}$ are methyl.

In some further embodiments of any of the aforementioned embodiments, one of $R^{21}$, $R^{22}$, and $R^{23}$ is a —OH or $C_{1-14}$ hydrocarbyloxy. In some further such embodiments, one of $R^{21}$, $R^{22}$, and $R^{23}$ is $C_{1-14}$ hydrocarbyloxy. In some even further such embodiments, one of $R^{21}$, $R^{22}$, and $R^{23}$ is selected independently from the group consisting of: methoxy, ethoxy, propoxy, isopropoxy, butoxy, isobutoxy, sec-butoxy, tert-butoxy, pentoxy, or neopentoxy. In some even further such embodiments, one of $R^{21}$, $R^{22}$, and $R^{23}$ is methoxy.

Methods of Making Siloxane Polymers

The siloxane polymers disclosed herein may be made by any suitable means. For example, in some cases, polysiloxane segments may be prepared by suitable means, where such polysiloxane segments have Si—H groups at their terminal points, which allows them to be reactive with carbon-carbon double bonds. Organic segments, such as those according to formula (II) can be prepared by suitable means. As described above, in some embodiments, methyl esters of 9-decenoic acid, 10-undecenoic acid, or 11-dodecenoic acid can be reacted with ethylene glycol or a polyethylene glycol, which reacts with the ester groups to form a segment having two terminal carbon-carbon double bonds.

This organic segment can then be reacted with the polysiloxane segments having terminal Si—H groups to form polysiloxanes according to certain embodiments disclosed herein.

Silicone Compositions

In one or more aspects, the present disclosure provides silicone compositions that comprise one or more siloxane polymers according to any of the embodiments set forth above. Such compositions can include the one or more siloxane polymers in any suitable concentration. For example, in some embodiments, the silicone polymer compositions comprise from 0.1 to 99 percent by weight, or from 0.5 to 99 percent by weight, or from 1 to 99 percent by weight, or from 5 to 99 percent by weight, of one or more siloxane polymers, based on the total weight of dry solids in the composition (i.e., the weight excluding the weight of any solvent(s), but including the weight of suspended or solvated non-solvent components).

In some embodiments, the silicone compositions disclosed herein include a carrier. Such compositions can include the one or more siloxane polymers in any suitable concentration. For example, in some embodiments, such silicone compositions comprise from 0.1 to 99 percent by weight, or from 0.5 to 99 percent by weight, or from 1 to 99 percent by weight, or from 5 to 99 percent by weight, based on the total weight of the composition. Any suitable carriers can be used. In some embodiments of any of the aforementioned embodiments, the carrier comprises water. In some other embodiments of any of the aforementioned embodiments, the carrier comprises an organic solvent.

The silicone compositions disclosed herein can also include one or more additives. For example, in some embodiments, the silicone composition includes one or more additives, such as surfactants, pigments, antimicrobial agents, photostabilizers, and the like.

The one or more siloxane polymers in the silicone compositions can have any suitable molecular weight range. For example, in some embodiments, the one or more siloxane polymers in the silicone composition have a weight-average molecular weight ranging from 1 kDa to 50 kDa.

Such silicone compositions can be used in any suitable way. For example, in some embodiments, the silicone composition is a surfactant composition, a sizing composition for a matrix reinforcement material (a siliceous material, such as silica or sand; glass, such as glass fiber, glass particles, or glass beads; a metal, such as silver or titanium; a metal oxide, such as zinc oxide or titanium dioxide; carbon, such as carbon nanoparticles, carbon nanotubes, graphite, graphene, diamond, and fullerenes, or any combination of the foregoing), a coating composition, a sealant composition, a grease composition, a defoaming composition, a dry-cleaning composition, a rubber composition, an ophthalmic composition, a personal care composition, a lubricant composition, a personal lubricant composition, a functional fluid, such as a brake fluid, a mold release composition, a gel composition, or an electronics encasement composition.

Articles of Manufacture

In one or more aspects, the present disclosure provides articles of manufacture formed from the silicone compositions of any of the aforementioned embodiments. The article of manufacture can be any suitable article of manufacture, such as those that may typically be formed using silicone polymers. For example, in some embodiments, the article of manufacture is an electrical insulating article, an electronic device (where, for example, the silicone composition is in a coating or sealing layer), a gasket, a seal, a pad, a mold (such as, for example, a dental mold), a paper article (such as a sheet, where, for example, the silicone composition is in a coating), a textile article (where, for example, the silicone composition is in a coating), a fire stop, a microfluidic device, a bandage, a dressing for a wound, a scar treatment sheet, a breast implant, a testicular implant, a pectoral implant, a contact lens, an ophthalmic tube, an ophthalmic stent, or a nipple, such as a nipple on a baby bottle.

Derivation from Renewable Sources

The siloxane polymers disclosed herein and used in any of the aspects and embodiments disclosed herein can, in certain embodiments, be derived from renewable sources, such as various natural oils. Any suitable methods can be used to make these compounds from such renewable sources. Suitable methods include, but are not limited to, fermentation, conversion by bioorganisms, and conversion by metathesis.

Olefin metathesis provides one possible means to convert certain natural oil feedstocks into olefins and esters that can be used in a variety of applications, or that can be further modified chemically and used in a variety of applications. In some embodiments, a composition (or components of a composition) may be formed from a renewable feedstock, such as a renewable feedstock formed through metathesis reactions of natural oils and/or their fatty acid or fatty ester derivatives. When compounds containing a carbon-carbon double bond undergo metathesis reactions in the presence of a metathesis catalyst, some or all of the original carbon-carbon double bonds are broken, and new carbon-carbon double bonds are formed. The products of such metathesis reactions include carbon-carbon double bonds in different locations, which can provide unsaturated organic compounds having useful chemical properties.

A wide range of natural oils, or derivatives thereof, can be used in such metathesis reactions. Examples of suitable natural oils include, but are not limited to, vegetable oils, algae oils, fish oils, animal fats, tall oils, derivatives of these oils, combinations of any of these oils, and the like. Representative non-limiting examples of vegetable oils include rapeseed oil (canola oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil feedstock comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil feedstock.

The natural oil may include canola or soybean oil, such as refined, bleached and deodorized soybean oil (i.e., RBD soybean oil). Soybean oil typically includes about 95 percent by weight (wt %) or greater (e.g., 99 wt % or greater) triglycerides of fatty acids. Major fatty acids in the polyol esters of soybean oil include but are not limited to saturated fatty acids such as palmitic acid (hexadecanoic acid) and stearic acid (octadecanoic acid), and unsaturated fatty acids such as oleic acid (9-octadecenoic acid), linoleic acid (9,12-octadecadienoic acid), and linolenic acid (9,12,15-octadecatrienoic acid).

Metathesized natural oils can also be used. Examples of metathesized natural oils include but are not limited to a metathesized vegetable oil, a metathesized algal oil, a metathesized animal fat, a metathesized tall oil, a metathesized derivatives of these oils, or mixtures thereof. For example, a metathesized vegetable oil may include metathesized canola oil, metathesized rapeseed oil, metathesized coconut oil, metathesized corn oil, metathesized cottonseed oil, metathesized olive oil, metathesized palm oil, metathesized peanut oil, metathesized safflower oil, metathesized sesame oil, metathesized soybean oil, metathesized sunflower oil, metathesized linseed oil, metathesized palm kernel oil, metathesized tung oil, metathesized jatropha oil, metathesized mustard oil, metathesized camelina oil, metathesized pennycress oil, metathesized castor oil, metathesized derivatives of these oils, or mixtures thereof. In another example, the metathesized natural oil may include a metathesized animal fat, such as metathesized lard, metathesized tallow, metathesized poultry fat, metathesized fish oil, metathesized derivatives of these oils, or mixtures thereof.

Such natural oils, or derivatives thereof, can contain esters, such as triglycerides, of various unsaturated fatty acids. The identity and concentration of such fatty acids varies depending on the oil source, and, in some cases, on the variety. In some embodiments, the natural oil comprises one or more esters of oleic acid, linoleic acid, linolenic acid, or any combination thereof. When such fatty acid esters are metathesized, new compounds are formed. For example, in embodiments where the metathesis uses certain short-chain olefins, e.g., ethylene, propylene, or 1-butene, and where the natural oil includes esters of oleic acid, an amount of 1-decene and 1-decenoid acid (or an ester thereof), among other products, are formed. Following transesterification, for example, with an alkyl alcohol, an amount of 9-denenoic acid alkyl ester is formed. In some such embodiments, a separation step may occur between the metathesis and the transesterification, where the alkenes are separated from the esters. In some other embodiments, transesterification can occur before metathesis, and the metathesis is performed on the transesterified product.

In some embodiments, the natural oil can be subjected to various pre-treatment processes, which can facilitate their utility for use in certain metathesis reactions. Useful pre-treatment methods are described in United States Patent Application Publication Nos. 2011/0113679, 2014/0275595, and 2014/0275681, all three of which are hereby incorporated by reference as though fully set forth herein.

In some embodiments, after any optional pre-treatment of the natural oil feedstock, the natural oil feedstock is reacted in the presence of a metathesis catalyst in a metathesis reactor. In some other embodiments, an unsaturated ester (e.g., an unsaturated glyceride, such as an unsaturated triglyceride) is reacted in the presence of a metathesis catalyst in a metathesis reactor. These polyol esters of unsaturated fatty acids may be a component of a natural oil feedstock, or may be derived from other sources, e.g., from esters generated in earlier-performed metathesis reactions. In certain embodiments, in the presence of a metathesis catalyst, the natural oil or unsaturated ester can undergo a self-metathesis reaction with itself. In other embodiments, the natural oil or unsaturated ester undergoes a cross-metathesis reaction with the low-molecular-weight olefin or mid-weight olefin. The self-metathesis and/or cross-metathesis reactions form a metathesized product wherein the metathesized product comprises olefins and esters.

In some embodiments, the low-molecular-weight olefin is in the $C_{2-6}$ range. As a non-limiting example, in one embodiment, the low-molecular-weight olefin may comprise at least one of: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1,4-pentadiene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. In some instances, a higher-molecular-weight olefin can also be used.

In some embodiments, the metathesis comprises reacting a natural oil feedstock (or another unsaturated ester) in the presence of a metathesis catalyst. In some such embodiments, the metathesis comprises reacting one or more unsaturated glycerides (e.g., unsaturated triglycerides) in the natural oil feedstock in the presence of a metathesis catalyst. In some embodiments, the unsaturated glyceride comprises one or more esters of oleic acid, linoleic acid, linoleic acid, or combinations thereof. In some other embodiments, the unsaturated glyceride is the product of the partial hydrogenation and/or the metathesis of another unsaturated glyceride (as described above). In some such embodiments, the metathesis is a cross-metathesis of any of the aforementioned unsaturated triglyceride species with another olefin, e.g., an alkene. In some such embodiments, the alkene used in the cross-metathesis is a lower alkene, such as ethylene, propylene, 1-butene, 2-butene, etc. In some embodiments, the alkene is ethylene. In some other embodiments, the alkene is propylene. In some further embodiments, the alkene is 1-butene. And in some even further embodiments, the alkene is 2-butene.

Metathesis reactions can provide a variety of useful products, when employed in the methods disclosed herein. For example, the polyol esters of unsaturated fatty acids may be derived from a natural oil feedstock, in addition to other valuable compositions. Moreover, in some embodiments, a number of valuable compositions can be targeted through the self-metathesis reaction of a natural oil feedstock, or the cross-metathesis reaction of the natural oil feedstock with a low-molecular-weight olefin or mid-weight olefin, in the presence of a metathesis catalyst. Such valuable compositions can include fuel compositions, detergents, surfactants, and other specialty chemicals. Additionally, transesterified products (i.e., the products formed from transesterifying an ester in the presence of an alcohol) may also be targeted, non-limiting examples of which include: fatty acid methyl esters ("FAMEs"); biodiesel; 9-decenoic acid ("9DA") esters, 9-undecenoic acid ("9UDA") esters, and/or 9-dodecenoic acid ("9DDA") esters; 9DA, 9UDA, and/or 9DDA; alkali metal salts and alkaline earth metal salts of 9DA, 9UDA, and/or 9DDA; dimers of the transesterified products; and mixtures thereof.

Further, in some embodiments, multiple metathesis reactions can also be employed. In some embodiments, the multiple metathesis reactions occur sequentially in the same reactor. For example, a glyceride containing linoleic acid can be metathesized with a terminal lower alkene (e.g., ethylene, propylene, 1-butene, and the like) to form 1,4-decadiene, which can be metathesized a second time with a terminal lower alkene to form 1,4-pentadiene. In other embodiments, however, the multiple metathesis reactions are not sequential, such that at least one other step (e.g., transesterification, hydrogenation, etc.) can be performed between the first metathesis step and the following metathesis step. These multiple metathesis procedures can be used to obtain products that may not be readily obtainable from a single metathesis reaction using available starting materials. For example, in some embodiments, multiple metathesis can involve self-metathesis followed by cross-metathesis to obtain metathesis dimers, trimmers, and the like. In some other embodiments, multiple metathesis can be used to obtain olefin and/or ester components that have chain lengths that may not be achievable from a single metathesis reaction with a natural oil triglyceride and typical lower alkenes (e.g., ethylene, propylene, 1-butene, 2-butene, and the like). Such multiple metathesis can be useful in an industrial-scale reactor, where it may be easier to perform multiple metathesis than to modify the reactor to use a different alkene.

The conditions for such metathesis reactions, and the reactor design, and suitable catalysts are as described above with reference to the metathesis of the olefin esters. That discussion is incorporated by reference as though fully set forth herein.

In the embodiments above, the natural oil (e.g., as a glyceride) is metathesized, followed by transesterification. In some other embodiments, transesterification can precede metathesis, such that the fatty acid esters subjected to metathesis are fatty acid esters of monohydric alcohols, such as methanol, ethanol, or isopropanol.

Olefin Metathesis

In some embodiments, one or more of the unsaturated monomers can be made by metathesizing a natural oil or natural oil derivative. The terms "metathesis" or "metathesizing" can refer to a variety of different reactions, including, but not limited to, cross-metathesis, self-metathesis, ring-opening metathesis, ring-opening metathesis polymerizations ("ROMP"), ring-closing metathesis ("RCM"), and acyclic diene metathesis ("ADMET"). Any suitable metathesis reaction can be used, depending on the desired product or product mixture.

In some embodiments, after any optional pre-treatment of the natural oil feedstock, the natural oil feedstock is reacted in the presence of a metathesis catalyst in a metathesis reactor. In some other embodiments, an unsaturated ester (e.g., an unsaturated glyceride, such as an unsaturated triglyceride) is reacted in the presence of a metathesis catalyst in a metathesis reactor. These unsaturated esters may be a component of a natural oil feedstock, or may be derived from other sources, e.g., from esters generated in earlier-performed metathesis reactions. In certain embodiments, in the presence of a metathesis catalyst, the natural oil or unsaturated ester can undergo a self-metathesis reaction with itself. In other embodiments, the natural oil or unsaturated ester undergoes a cross-metathesis reaction with the low-molecular-weight olefin or mid-weight olefin. The self-metathesis and/or cross-metathesis reactions form a metathesized product wherein the metathesized product comprises olefins and esters.

In some embodiments, the low-molecular-weight olefin is in the $C_{2-6}$ range. As a non-limiting example, in one embodiment, the low-molecular-weight olefin may comprise at least one of: ethylene, propylene, 1-butene, 2-butene, isobutene, 1-pentene, 2-pentene, 3-pentene, 2-methyl-1-butene, 2-methyl-2-butene, 3-methyl-1-butene, cyclopentene, 1,4-pentadiene, 1-hexene, 2-hexene, 3-hexene, 4-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. In some instances, a higher-molecular-weight olefin can also be used.

In some embodiments, the metathesis comprises reacting a natural oil feedstock (or another unsaturated ester) in the presence of a metathesis catalyst. In some such embodiments, the metathesis comprises reacting one or more unsaturated glycerides (e.g., unsaturated triglycerides) in the natural oil feedstock in the presence of a metathesis catalyst. In some embodiments, the unsaturated glyceride comprises one or more esters of oleic acid, linoleic acid, linoleic acid, or combinations thereof. In some other embodiments, the unsaturated glyceride is the product of the partial hydrogenation and/or the metathesis of another unsaturated glyceride (as described above). In some such embodiments, the metathesis is a cross-metathesis of any of the aforementioned unsaturated triglyceride species with another olefin, e.g., an alkene. In some such embodiments, the alkene used in the cross-metathesis is a lower alkene, such as ethylene, propylene, 1-butene, 2-butene, etc. In some embodiments, the alkene is ethylene. In some other embodiments, the alkene is propylene. In some further embodiments, the alkene is 1-butene. And in some even further embodiments, the alkene is 2-butene.

Metathesis reactions can provide a variety of useful products, when employed in the methods disclosed herein. For example, terminal olefins and internal olefins may be derived from a natural oil feedstock, in addition to other valuable compositions. Moreover, in some embodiments, a number of valuable compositions can be targeted through the self-metathesis reaction of a natural oil feedstock, or the cross-metathesis reaction of the natural oil feedstock with a low-molecular-weight olefin or mid-weight olefin, in the presence of a metathesis catalyst. Such valuable compositions can include fuel compositions, detergents, surfactants, and other specialty chemicals. Additionally, transesterified products (i.e., the products formed from transesterifying an ester in the presence of an alcohol) may also be targeted, non-limiting examples of which include: fatty acid methyl esters ("FAMEs"); biodiesel; 9-decenoic acid ("9DA") esters, 9-undecenoic acid ("9UDA") esters, and/or 9-dodecenoic acid ("9DDA") esters; 9DA, 9UDA, and/or 9DDA; alkali metal salts and alkaline earth metal salts of 9DA, 9UDA, and/or 9DDA; dimers of the transesterified products; and mixtures thereof.

Further, in some embodiments, the methods disclosed herein can employ multiple metathesis reactions. In some embodiments, the multiple metathesis reactions occur sequentially in the same reactor. For example, a glyceride containing linoleic acid can be metathesized with a terminal lower alkene (e.g., ethylene, propylene, 1-butene, and the like) to form 1,4-decadiene, which can be metathesized a second time with a terminal lower alkene to form 1,4-pentadiene. In other embodiments, however, the multiple metathesis reactions are not sequential, such that at least one other step (e.g., transesterification, hydrogenation, etc.) can be performed between the first metathesis step and the following metathesis step. These multiple metathesis procedures can be used to obtain products that may not be readily obtainable from a single metathesis reaction using available starting materials. For example, in some embodiments, multiple metathesis can involve self-metathesis followed by cross-metathesis to obtain metathesis dimers, trimmers, and the like. In some other embodiments, multiple metathesis can be used to obtain olefin and/or ester components that have chain lengths that may not be achievable from a single metathesis reaction with a natural oil triglyceride and typical lower alkenes (e.g., ethylene, propylene, 1-butene, 2-butene, and the like). Such multiple metathesis can be useful in an industrial-scale reactor, where it may be easier to perform multiple metathesis than to modify the reactor to use a different alkene.

The metathesis process can be conducted under any conditions adequate to produce the desired metathesis products. For example, stoichiometry, atmosphere, solvent, temperature, and pressure can be selected by one skilled in the art to produce a desired product and to minimize undesirable byproducts. In some embodiments, the metathesis process may be conducted under an inert atmosphere. Similarly, in embodiments were a reagent is supplied as a gas, an inert gaseous diluent can be used in the gas stream. In such embodiments, the inert atmosphere or inert gaseous diluent typically is an inert gas, meaning that the gas does not interact with the metathesis catalyst to impede catalysis to a substantial degree. For example, non-limiting examples of inert gases include helium, neon, argon, and nitrogen, used individually or in with each other and other inert gases.

The rector design for the metathesis reaction can vary depending on a variety of factors, including, but not limited to, the scale of the reaction, the reaction conditions (heat, pressure, etc.), the identity of the catalyst, the identity of the materials being reacted in the reactor, and the nature of the feedstock being employed. Suitable reactors can be designed by those of skill in the art, depending on the relevant factors, and incorporated into a refining process such, such as those disclosed herein.

The metathesis reactions disclosed herein generally occur in the presence of one or more metathesis catalysts. Such methods can employ any suitable metathesis catalyst. The metathesis catalyst in this reaction may include any catalyst or catalyst system that catalyzes a metathesis reaction. Any known metathesis catalyst may be used, alone or in combination with one or more additional catalysts. Examples of metathesis catalysts and process conditions are described in US 2011/0160472, incorporated by reference herein in its entirety, except that in the event of any inconsistent disclosure or definition from the present specification, the disclosure or definition herein shall be deemed to prevail. A number of the metathesis catalysts described in US 2011/0160472 are presently available from Materia, Inc. (Pasadena, Calif.).

In some embodiments, the metathesis catalyst includes a Grubbs-type olefin metathesis catalyst and/or an entity derived therefrom. In some embodiments, the metathesis catalyst includes a first-generation Grubbs-type olefin metathesis catalyst and/or an entity derived therefrom. In some embodiments, the metathesis catalyst includes a second-generation Grubbs-type olefin metathesis catalyst and/or an entity derived therefrom. In some embodiments, the metathesis catalyst includes a first-generation Hoveyda-Grubbs-type olefin metathesis catalyst and/or an entity derived therefrom. In some embodiments, the metathesis catalyst includes a second-generation Hoveyda-Grubbs-type olefin metathesis catalyst and/or an entity derived therefrom. In some embodiments, the metathesis catalyst includes one or a plurality of the ruthenium carbene metathesis catalysts sold by Materia, Inc. of Pasadena, California and/or one or more entities derived from such catalysts. Representative metathesis catalysts from Materia, Inc. for use in accordance with the present teachings include but are not limited to those sold under the following product numbers as well as combinations thereof: product no. C823 (CAS no. 172222-30-9), product no. C848 (CAS no. 246047-72-3), product no. C601 (CAS no. 203714-71-0), product no. C627 (CAS no. 301224-40-8), product no. C571 (CAS no. 927429-61-6), product no. C598 (CAS no. 802912-44-3), product no. C793 (CAS no. 927429-60-5), product no. C801 (CAS no. 194659-03-9), product no. C827 (CAS no. 253688-91-4), product no. C884 (CAS no. 900169-53-1), product no. C833 (CAS no. 1020085-61-3), product no. C859 (CAS no. 832146-68-6), product no. C711 (CAS no. 635679-24-2), product no. C933 (CAS no. 373640-75-6).

In some embodiments, the metathesis catalyst includes a molybdenum and/or tungsten carbene complex and/or an entity derived from such a complex. In some embodiments, the metathesis catalyst includes a Schrock-type olefin metathesis catalyst and/or an entity derived therefrom. In some embodiments, the metathesis catalyst includes a high-oxidation-state alkylidene complex of molybdenum and/or an entity derived therefrom. In some embodiments, the metathesis catalyst includes a high-oxidation-state alkylidene complex of tungsten and/or an entity derived therefrom. In some embodiments, the metathesis catalyst includes molybdenum (VI). In some embodiments, the metathesis catalyst includes tungsten (VI). In some embodiments, the metathesis catalyst includes a molybdenum- and/or a tungsten-containing alkylidene complex of a type described in one or more of (a) Angew. Chem. Int. Ed. Engl., 2003, 42, 4592-4633; (b) Chem. Rev., 2002, 102, 145-179; and/or (c) Chem. Rev., 2009, 109, 3211-3226, each of which is incorporated by reference herein in its entirety, except that in the event of any inconsistent disclosure or definition from the present specification, the disclosure or definition herein shall be deemed to prevail.

In certain embodiments, the metathesis catalyst is dissolved in a solvent prior to conducting the metathesis reaction. In certain such embodiments, the solvent chosen may be selected to be substantially inert with respect to the metathesis catalyst. For example, substantially inert solvents include, without limitation: aromatic hydrocarbons, such as benzene, toluene, xylenes, etc.; halogenated aromatic hydrocarbons, such as chlorobenzene and dichlorobenzene; aliphatic solvents, including pentane, hexane, heptane, cyclohexane, etc.; and chlorinated alkanes, such as dichloromethane, chloroform, dichloroethane, etc. In some embodiments, the solvent comprises toluene.

In other embodiments, the metathesis catalyst is not dissolved in a solvent prior to conducting the metathesis reaction. The catalyst, instead, for example, can be slurried with the natural oil or unsaturated ester, where the natural oil or unsaturated ester is in a liquid state. Under these conditions, it is possible to eliminate the solvent (e.g., toluene) from the process and eliminate downstream olefin losses when separating the solvent. In other embodiments, the metathesis catalyst may be added in solid state form (and not slurried) to the natural oil or unsaturated ester (e.g., as an auger feed).

The metathesis reaction temperature may, in some instances, be a rate-controlling variable where the temperature is selected to provide a desired product at an acceptable rate. In certain embodiments, the metathesis reaction temperature is greater than $-40°$ C., or greater than $-20°$ C., or greater than $0°$ C., or greater than $10°$ C. In certain embodiments, the metathesis reaction temperature is less than $200°$ C., or less than $150°$ C., or less than $120°$ C. In some embodiments, the metathesis reaction temperature is between $0°$ C. and $150°$ C., or is between $10°$ C. and $120°$ C.

The metathesis reaction can be run under any desired pressure. In some instances, it may be desirable to maintain a total pressure that is high enough to keep the cross-metathesis reagent in solution. Therefore, as the molecular weight of the cross-metathesis reagent increases, the lower pressure range typically decreases since the boiling point of the cross-metathesis reagent increases. The total pressure may be selected to be greater than 0.1 atm (10 kPa), or greater than 0.3 atm (30 kPa), or greater than 1 atm (100 kPa). In some embodiments, the reaction pressure is no more than about 70 atm (7000 kPa), or no more than about 30 atm (3000 kPa). In some embodiments, the pressure for the metathesis reaction ranges from about 1 atm (100 kPa) to about 30 atm (3000 kPa).

EXAMPLES

General Procedure for the Preparation of Terminally Unsaturated Diesters:

Into a 1 liter 3-necked round-bottomed flask equipped with a rubber septum fitted with a needle to bubble nitrogen through the reaction mixture, thermocouple, J-Kem controller, heating mantle, stir bar, short path distillation apparatus, and nitrogen outlet was added the 9-decenoic acid methyl ester (Elevance Renewable Sciences, Woodridge, IL)

General Procedure for the Preparation of Segmented Diester-Polysiloxane Copolymers:

Into a 50 ml 3-necked round-bottomed flask equipped with a thermocouple, J-Kem controller, heating mantle, glass stopper, and nitrogen inlet was added in the Silmer H Di-10 hydrosilane (Siltech, Lawrenceville, GA) (1.0 eq. MW=875) and the relevant diester produced above (0.50 eq.). The Karstedt's catalyst (Pt(0)-1,3-divinyl-1,1,3,3,-tetramethyl disiloxane complex solution) (Sigma-Aldrich, St. Louis, MO) was added (1 drop, 5 microliters) which resulted in a significant exotherm in the case of the EGuC10DE that required the use of a dry ice/methanol bath to maintain the temperature blow 65° C. Once the temperature stabilized, then the remaining diester (0.50 eq.) was added at a rate to hold the temperature at 65° C. Once the addition was complete, then the reaction was held at 65° C. for about an hour. The resulting segmented polysiloxane copolymers were analyzed without further purification.

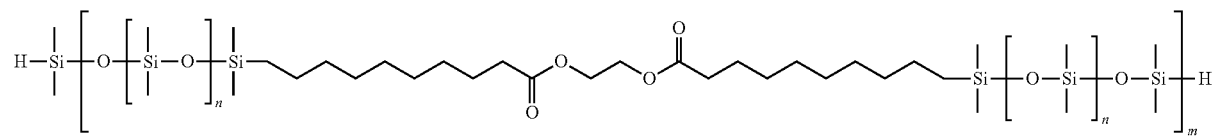

EG-uC10DE:Silmer H Di-10 (1:1.2)

(9-DAME, 507 g, 2.75 mol) and either ethylene glycol (EG, ethane-1,2-glycol) or neopentyl glycol (NPG, 2,2-dimethyl-propane-1,3,-diol) (Sigma-Aldrich, St. Louis, MO)(1.52 mol, 1.1 eq.). The nitrogen was bubbled through the reaction mixture (15 min) prior to the addition of sodium methoxide in methanol as a catalyst (25 wt % in methanol) (Sigma-Aldrich, St. Louis, MO) (6.0 g, 27.8 mmol, 0.3 wt %). The now yellow solution was slowly heated to 200° C. while the methanol was collected in the receiving flask (−78° C.). The reaction was judged complete by gas chromatography after 6 h.

The crude reaction mixture was subjected to fractional distillation to remove residual starting materials from the desired product. The ethylene glycol-based diester (EGu-C10DE) was collected at 165° C./0.20 Torr (98.2 area % purity by gas chromatography, m/z=366 by mass spectrometry) while the neopentyl glycol-based diester (NPG-uC10DE) was collected at 177° C./0.33 Torr (97.9 area % purity; m/z=408; 1H-NMR (ppm) 5.8 (2H, m), 4.9 (4H, d of d), 3.9 (4H, s), 2.3 (4H, t), 2.0 (4H, m), 1.6 (4H, m), 1.3 (16H, m), 0.9 (6H, s)). Residual 9-DAME was less than 0.5 wt % for each diester product.

Brookfield viscosity and number average molecular weights (Mn) by size exclusion chromatography (SEC) of the monomers and segmented polysiloxane copolymers are shown in Table 1.

Table 1. Characterization of Monomers and Hybrid Segmented Copolymers.

TABLE 1

Characterization of monomers and hybrid segmented copolymers.

| | Appearance | Viscosity (Cp) | $M_n$ (Da) |
|---|---|---|---|
| Monomers | | | |
| EG-uC10DE | Clear, colorless | 11 | 367 |
| NPG-uC10DE | Clear, colorless | 13 | 409 |
| Silmer H Di-10 | Clear, colorless | 6.9 | 875 |
| Copolymers | | | |
| EG-uC10DE:Silmer H Di-10 (1:1) | Clear, colorless | 7830 | 46,800 |

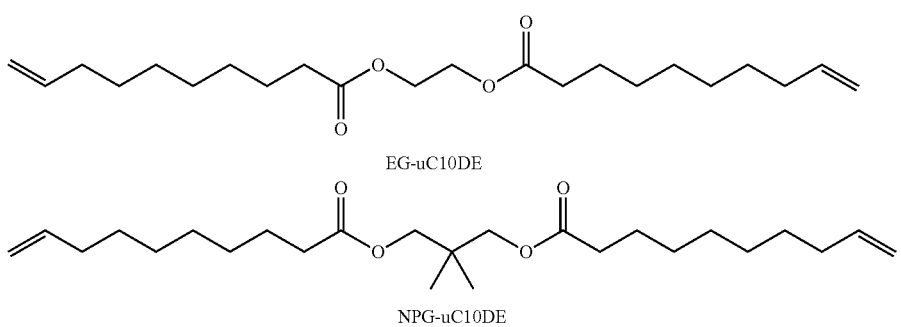

TABLE 1-continued

Characterization of monomers and hybrid segmented copolymers.

| | Appearance | Viscosity (Cp) | $M_n$ (Da) |
|---|---|---|---|
| EG-uC10DE:Silmer H Di-10 (1:1.1) | Clear, colorless | 3400 | 38,300 |
| EG-uC10DE:Silmer H Di-10 (1.2:1) | Clear, colorless | 1730 | 32,500 |
| EG-uC10DE:Silmer H Di-10 (1:2) | Clear, colorless | 100 | 11,300 |
| NPG-uC10DE:Silmer H Di-10 (1:1) | Clear, colorless | 6910 | 43,600 |

Illustrations

Illustration 1 is a siloxane polymer comprising:
(a) one or more segments of formula (I):

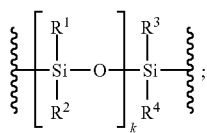

and
(b) one or more segments of formula (II):

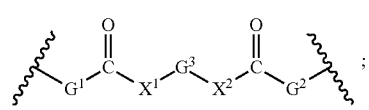

wherein:
each $R^1$, $R^2$, $R^3$, and $R^4$ is independently a hydrogen atom, a $C_{1-14}$ hydrocarbyl group, or a $C_{1-14}$ hydrocarbyloxy group;
each $X^1$ and $X^2$ is independently an oxygen atom, a sulfur atom, >NH, or >N($C_{1-6}$alkyl);
each $G^1$ and $G^2$ is independently a $C_{1-14}$ hydrocarbylene group;
each $G^3$ is independently a $C_{1-14}$ hydrocarbylene group, which is optionally substituted one or more times by substituents selected from the group consisting of —OH and —O($C_{1-6}$alkyl); and
each k is independently an integer ranging from 5 to 5000.

Illustration 2 is the siloxane polymer of any preceding or subsequent illustration, wherein each $G^1$ is —$(CH_2)_9$—.

Illustration 3 is the siloxane polymer of any preceding or subsequent illustration, wherein each $G^1$ is —$(CH_2)_{10}$—.

Illustration 4 is the siloxane polymer of any preceding or subsequent illustration, wherein each $G^1$ is —$(CH_2)_{11}$—.

Illustration 5 is the siloxane polymer of any preceding or subsequent illustration, wherein each $G^2$ is —$(CH_2)_9$—.

Illustration 6 is the siloxane polymer of any preceding or subsequent illustration, wherein each $G^2$ is —$(CH_2)_{10}$—.

Illustration 7 is the siloxane polymer of any preceding or subsequent illustration, wherein each $G^2$ is —$(CH_2)_{11}$—.

Illustration 8 is the siloxane polymer of any preceding or subsequent illustration, wherein each $G^3$ is a $C_{1-14}$alkylene group.

Illustration 9 is the siloxane polymer of any preceding or subsequent illustration, wherein each $G^3$ is a $C_{1-8}$ alkylene group.

Illustration 10 is the siloxane polymer of any preceding or subsequent illustration, wherein each $G^3$ is —$(CH_2)_{1-6}$—.

Illustration 11 is the siloxane polymer of any preceding or subsequent illustration, wherein each $G^3$ is —$(CH_2)_2$—.

Illustration 12 is the siloxane polymer of any preceding or subsequent illustration, wherein each $X^1$ is an oxygen atom.

Illustration 13 is the siloxane polymer of any preceding or subsequent illustration, wherein each $X^2$ is an oxygen atom.

Illustration 14 is the siloxane polymer of any preceding or subsequent illustration, wherein each $R^1$, $R^2$, $R^3$, and $R^4$ is independently a hydrogen atom or a $C_{1-14}$ hydrocarbyl group.

Illustration 15 is the siloxane polymer of any preceding or subsequent illustration, wherein each $R^1$, $R^2$, $R^3$, and $R^4$ is independently a $C_{1-14}$ hydrocarbyl group.

Illustration 16 is the siloxane polymer of any preceding or subsequent illustration, wherein each $R^1$, $R^2$, $R^3$, and $R^4$ is independently a $C_{1-8}$ alkyl group.

Illustration 17 is the siloxane polymer of any preceding or subsequent illustration, wherein each $R^1$, $R^2$, $R^3$, and $R^4$ is independently selected from the group consisting of methyl, ethyl, propyl, and isopropyl.

Illustration 18 is the siloxane polymer of any preceding or subsequent illustration, wherein each $R^1$, $R^2$, $R^3$, and $R^4$ is independently selected from the group consisting of methyl and ethyl.

Illustration 19 is the siloxane polymer of any preceding or subsequent illustration, wherein each $R^1$, $R^2$, $R^3$, and $R^4$ is methyl.

Illustration 20 is the siloxane polymer of any preceding or subsequent illustration, wherein at least one of $R^1$, $R^2$, $R^3$, and $R^4$ is a hydrogen atom.

Illustration 21 is the siloxane polymer of any preceding or subsequent illustration, wherein the siloxane polymer has a molecular weight ranging from 1 kDa to 50 kDa.

Illustration 22 is the siloxane polymer of any preceding or subsequent illustration, wherein the segments of formula (I) and the segments of formula (II) together make up at least 60% by weight, or at least 70% by weight, or at least 80% by weight, or at least 90% by weight, of the siloxane polymer.

Illustration 23 is the siloxane polymer of any preceding or subsequent illustration, wherein the segments of formula (I) make up at least 50% by weight, or at least 60% by weight, or at least 70% by weight, or at least 80% by weight, or at least 90% by weight, of the siloxane polymer.

Illustration 24 is the siloxane polymer of any preceding or subsequent illustration, wherein the segments of formula (I) make up no more than 70% by weight, or no more than 80% by weight, or no more than 90% by weight, of the the siloxane polymer Illustration 25 is the siloxane polymer of any preceding or subsequent illustration, wherein the segments of formula (II) make up at least 10% by weight, or at least 20% by weight, or at least 30% by weight, or at least 40% by weight, of the siloxane polymer.

Illustration 26 is the siloxane polymer of any preceding or subsequent illustration, wherein the segments of formula (II) make up no more than 10% by weight, or no more than 20% by weight, or no more than 30% by weight, of the siloxane polymer.

Illustration 27 is the siloxane polymer of any preceding or subsequent illustration, wherein the numerical ratio of segments of formula (I) to segments of formula (II) in the siloxane polymer ranges from 1:5 to 5:1, or from 1:4 to 4:1, or from 1:3 to 3:1, or from 1:2 to 2:1.

Illustration 28 is the siloxane polymer of any preceding or subsequent illustration, having two or more endcap groups.

Illustration 29 is the siloxane polymer of any preceding or subsequent illustration, wherein the endcap groups are moieties of formula (III):

 (III)

wherein:
$R^{21}$, $R^{22}$, and $R^{23}$ are independently a hydrogen atom, —OH, $C_{1-14}$ hydrocarbyl, or $C_{1-14}$ hydrocarbyloxy; and
m is 0 or 1.

Illustration 30 is the siloxane polymer of any preceding or subsequent illustration, wherein at least two of $R^{21}$, $R^{22}$, and $R^{23}$ is a hydrogen atom or $C_{1-14}$ hydrocarbyl.

Illustration 31 is the siloxane polymer of any preceding or subsequent illustration, wherein at least two of $R^{21}$, $R^{22}$, and $R^{23}$ is $C_{1-14}$ hydrocarbyl.

Illustration 32 is the siloxane polymer of any preceding or subsequent illustration, wherein at least two of $R^{21}$, $R^{22}$, and $R^{23}$ are selected independently from the group consisting of: methyl, ethyl, propyl, isopropyl, butyl, isobutyl, sec-butyl, tert-butyl, pentyl, or neopentyl.

Illustration 33 is the siloxane polymer of any preceding or subsequent illustration, wherein at least two of $R^{21}$, $R^{22}$, and $R^{23}$ are methyl.

Illustration 34 is the siloxane polymer of any preceding or subsequent illustration, wherein one of $R^{21}$, $R^{22}$, and $R^{23}$ is a —OH or $C_{1-14}$ hydrocarbyloxy.

Illustration 35 is the siloxane polymer of any preceding or subsequent illustration, wherein one of $R^{21}$, $R^{22}$, and $R^{23}$ is $C_{1-14}$ hydrocarbyloxy.

Illustration 36 is the siloxane polymer of any preceding or subsequent illustration, wherein one of $R^{21}$, $R^{22}$, and $R^{23}$ is selected independently from the group consisting of: methoxy, ethoxy, propoxy, isopropoxy, butoxy, isobutoxy, sec-butoxy, tert-butoxy, pentoxy, or neopentoxy.

Illustration 37 is the siloxane polymer of any preceding or subsequent illustration, wherein one of $R^{21}$, $R^{22}$, and $R^{23}$ is methoxy.

Illustration 38 is the siloxane polymer of any preceding or subsequent illustration, the silicone composition comprising one or more siloxane polymers of any one of illustrations 1 to 37.

Illustration 39 is the siloxane polymer of any preceding or subsequent illustration, wherein the silicone composition comprises a carrier, and wherein the one or more siloxane polymers make up from 0.1 to 95 percent by weight of the silicone composition, based on the total weight of the composition.

Illustration 40 is the siloxane polymer of any preceding or subsequent illustration, wherein the carrier comprises water.

Illustration 41 is the siloxane polymer of any preceding or subsequent illustration, wherein the carrier comprises an organic solvent.

Illustration 42 is the siloxane polymer of any preceding or subsequent illustration, further comprising one or more additives, such as surfactants, pigments, antimicrobial agents, photostabilizers, and the like.

Illustration 43 is the siloxane polymer of any preceding or subsequent illustration, wherein the one or more siloxane polymers have a weight-average molecular weight ranging from 1 kDa to 50 kDa.

Illustration 44 is the siloxane polymer of any preceding or subsequent illustration, wherein the silicone composition is a surfactant composition, a sizing composition for a matrix reinforcement material (a siliceous material, such as silica or sand; glass, such as glass fiber, glass particles, or glass beads; a metal, such as silver or titanium; a metal oxide, such as zinc oxide or titanium dioxide; carbon, such as carbon nanoparticles, carbon nanotubes, graphite, graphene, diamond, and fullerenes, or any combination of the foregoing), a coating composition, a sealant composition, a grease composition, a defoaming composition, a dry-cleaning composition, a rubber composition, an ophthalmic composition, a personal care composition, a lubricant composition, a personal lubricant composition, a functional fluid, such as a brake fluid, a mold release composition, a gel composition, or an electronics encasement composition.

Illustration 45 an article of manufacture, which comprises a portion formed from a silicone composition of any preceding or subsequent illustration.

Illustration 46 is the article of manufacture which comprises a portion formed from a silicone composition of any preceding or subsequent illustration, and which is an electrical insulating article, an electronic device (where, for example, the silicone composition is in a coating or sealing layer), a gasket, a seal, a pad, a mold (such as, for example, a dental mold), a paper article (such as a sheet, where, for example, the silicone composition is in a coating), a textile article (where, for example, the silicone composition is in a coating), a fire stop, a microfluidic device, a bandage, a dressing for a wound, a scar treatment sheet, a breast implant, a testicular implant, a pectoral implant, a contact lens, an ophthalmic tube, an ophthalmic stent, or a nipple, such as a nipple on a baby bottle.

What is claimed is:
1. A silicone composition, the silicone composition comprising:
one or more siloxane polymers comprising:
(a) one or more segments of formula (I):

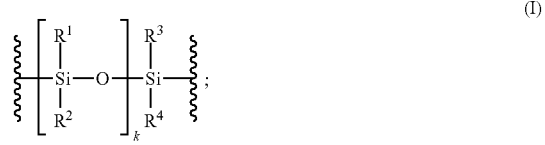 (I)

and
(b) one or more segments of formula (II):
wherein:

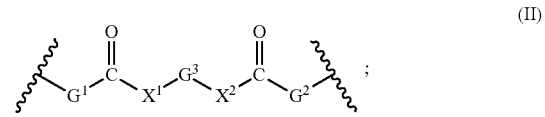 (II)

each $R^1$, $R^2$, $R^3$, and $R^4$ is independently a hydrogen atom, a $C_{1-14}$ hydrocarbyl group, or a $C_{1-14}$ hydrocarbyloxygroup, wherein at least one of $R^1$, $R^2$, $R^3$, and $R^4$ is a hydrogen atom;
each $X^1$ and $X^2$ is independently an oxygen atom, a sulfur atom, >NH, or >N($C_{1-6}$ alkyl);
each $G^1$ and $G^2$ is independently a $C_{1-14}$ hydrocarbylene group;
each $G^3$ is independently a $C_{1-14}$ hydrocarbylene group, which is optionally substituted one or more times by substituents selected from the group consisting of —OH and —O($C_{1-6}$ alkyl);
each k is independently an integer ranging from 5 to 5000;

wherein the silicone composition comprises a carrier; and
wherein the one or more siloxane polymers make up from 0.1 to 95 percent by weight of the silicone composition, based on the total weight of the composition.

2. The silicone composition of claim 1, wherein $G^1$ and $G^2$ of the one or more siloxane polymers comprising segments of formula (II) are independently selected from the group consisting of —$(CH_2)_9$—, —$(CH_2)_{10}$—, and —$(CH_2)_{11}$—.

3. The silicone composition of claim 1, wherein each $G^3$ of the one or more siloxane polymers comprising segments of formula (II) is independently selected from the group consisting of a $C_{1-14}$ alkylene group, a $C_{1-8}$ alkylene group, —$(CH_2)_{1-6}$, and —$(CH_2)_2$—.

4. The silicone composition of claim 1, wherein each $R^1$, $R^2$, $R^3$, and $R^4$ of the one or more siloxane polymers comprising segments of formula (I) is independently a hydrogen atom, a $C_{1-14}$ hydrocarbyl group, or $C_{1-8}$ alkyl group.

5. The silicone composition of claim 4, wherein each $R^1$, $R^2$, $R^3$, and $R^4$ of the one or more siloxane polymers comprising formula (I) is independently selected from the group consisting of methyl, ethyl, propyl, and isopropyl.

6. The silicone composition of claim 1, wherein the segments of the one or more siloxane polymers comprising formula (I) and the segments of the one or more siloxane polymers comprising segments of formula (II) together make up at least 60% by weight of the siloxane polymer, wherein the segments of the one or more siloxane polymers comprising segments of formula (I) make up at least 50% by weight of the siloxane polymer, wherein the segments of the one or more siloxane polymers comprising formula (II) makeup at least 10% by weight of the siloxane polymer.

7. The silicone composition of claim 1, wherein the one or more siloxane polymers comprise two or more endcap groups, wherein the endcap groups are moieties of formula (III):

—$(O)_m$—$Si(R^{21})(R^{22})(R^{23})$ (III)

wherein:
$R^{21}$, $R^{22}$, and $R^{23}$ are independently a hydrogen atom, —OH, $C_{1-14}$ hydrocarbyl, or $C_{1-14}$ hydrocarbyloxy; and
m is 0 or 1.

8. The silicone composition of claim 7, wherein at least two of $R^{21}$, $R^{22}$, and $R^{23}$ of the one or more siloxane polymers comprising moieties of formula (III) is a hydrogen atom or $C_{1-14}$ hydrocarbyl.

9. The silicone composition of claim 7, wherein one of $R^{21}$, $R^{22}$, and $R^{23}$ of the one or more siloxane polymers comprising moieties of formula (III) is a —OH or $C_{1-14}$ hydrocarbyloxy.

10. The silicone composition of claim 1, wherein the carrier comprises water.

11. The silicone composition of claim 1, wherein the carrier comprises an organic solvent.

12. The silicone composition of claim 1, further comprising one or more additives comprising surfactants, pigments, antimicrobial agents, or photostabilizers.

13. The silicone composition of claim 1, wherein the one or more siloxane polymers have a weight-average molecular weight ranging from 1 kDa to 50 kDa.

14. An article of manufacture, which comprises a portion formed from a silicone composition of claim 1.

15. The article of manufacture of claim 14, which is an electrical insulating article, a coating layer, a sealing layer, a portion of an electronic device, a gasket, a seal, a pad, a mold, a paper article, a textile article, a fire stop, a microfluidic device, a bandage, a dressing for a wound, a scar treatment sheet, a breast implant, a testicular implant, a pectoral implant, a contact lens, an ophthalmic tube, an ophthalmic stent, or a nipple.

16. The silicone composition of claim 1, wherein each $X^1$ and $X^2$ of the one or more siloxane polymers comprising segments of formula (II) is an oxygen atom.

* * * * *